Jan. 11, 1955 R. KOBLER 2,699,466

COMBINED PHONOGRAPH-TELEPHONE SYSTEM

Filed July 12, 1952

INVENTOR
Richard Kobler
BY George H. Fritzinger

United States Patent Office 2,699,466

Patented Jan. 11, 1955

2,699,466

COMBINED PHONOGRAPH-TELEPHONE SYSTEM

Richard Kobler, New York, N. Y., assignor to Thomas A. Edison, Incorporated, West Orange, N. J., a corporation of New Jersey Application July 12, 1952, Serial No. 298,600

13 Claims. (Cl. 179—6)

This invention relates to a combined phonograph-telephone system wherein a combined telephone subscriber's station and a phonograph operator's station, herein referred to simply as an executive's station, is provided with novel selector means for conditioning the system for phonograph or telephone use.

By way of preferred illustration, I herein describe my invention in connection with a standard automatic dial telephone system known on the market as a private automatic exchange (P. A. X.) system, and in connection with a remote-control multistation phonograph system such as is described in the pending Somers et al. application Serial No. 247,244, filed September 19, 1951, and having common ownership with the present application. However, no unnecessary limitation of the invention to these particular telephone-phonograph systems is intended.

The phonograph system above referred to has at each executive's station a transducer (a transmitter or receiver), an on-off station switch for activating the phonographic machine for use as the switch is moved to "on" position, a start-stop control, and a "busy" lamp for indicating when the system is in use. Since such a phonograph system is generally used for dictation recording, and it is desirable that for this purpose the user have also the facility to listen back to portions of his recorded dictation, each executive's station is typically provided with both a transmitter and receiver and also with a playback control.

The phrase "activating the phonographic machine for use" is herein employed to mean a conditioning of the machine for start-stop operation for recording and/or reproducing. As will appear, my invention is not necessarily limited to phonograph systems of the multistation type—i. e., systems wherein one machine serves a plurality of executives' stations—but when a multistation phonograph system is employed the phrase "activated for use" may include a reservation of the phonographic machine in a positive or indicative manner.

Objects of my invention are to provide combined phonograph-telephone systems wherein an executive's station is provided with one handset and a selective control means for conditioning his station at will for normal telephone use, for normal phonograph use while maintaining operative the telephone ringing circuit to enable outside parties to call while dictation is being recorded, or for temporary telephone use while maintaining the phonographic machine in an activated or reserve condition to enable resumption of use of the machine when a telephone call is completed.

Another object is to provide such selective control means in the form of a manually-operable unitary switch device.

Another object is to provide means to detent the unitary switch device in normal telephone and normal phonograph positions and to provide means to return the control means to normal phonograph position when it is released from its temporary position.

Still further objects are to maintain particularly the phonographic machine in activated condition while the selector switch is in its temporary position, and to maintain particularly the telephone ringing apparatus operative while the selector switch is in normal phonograph position.

A still further object is to provide a phonographic adapter box arranged for easy mechanical connection to a standard subscriber's telephone set.

These and other objects and features of my invention will be apparent from the following description and the appended claims.

In the description of my invention reference is had to the accompanying drawings, of which:

Figures 1, 2, 3:
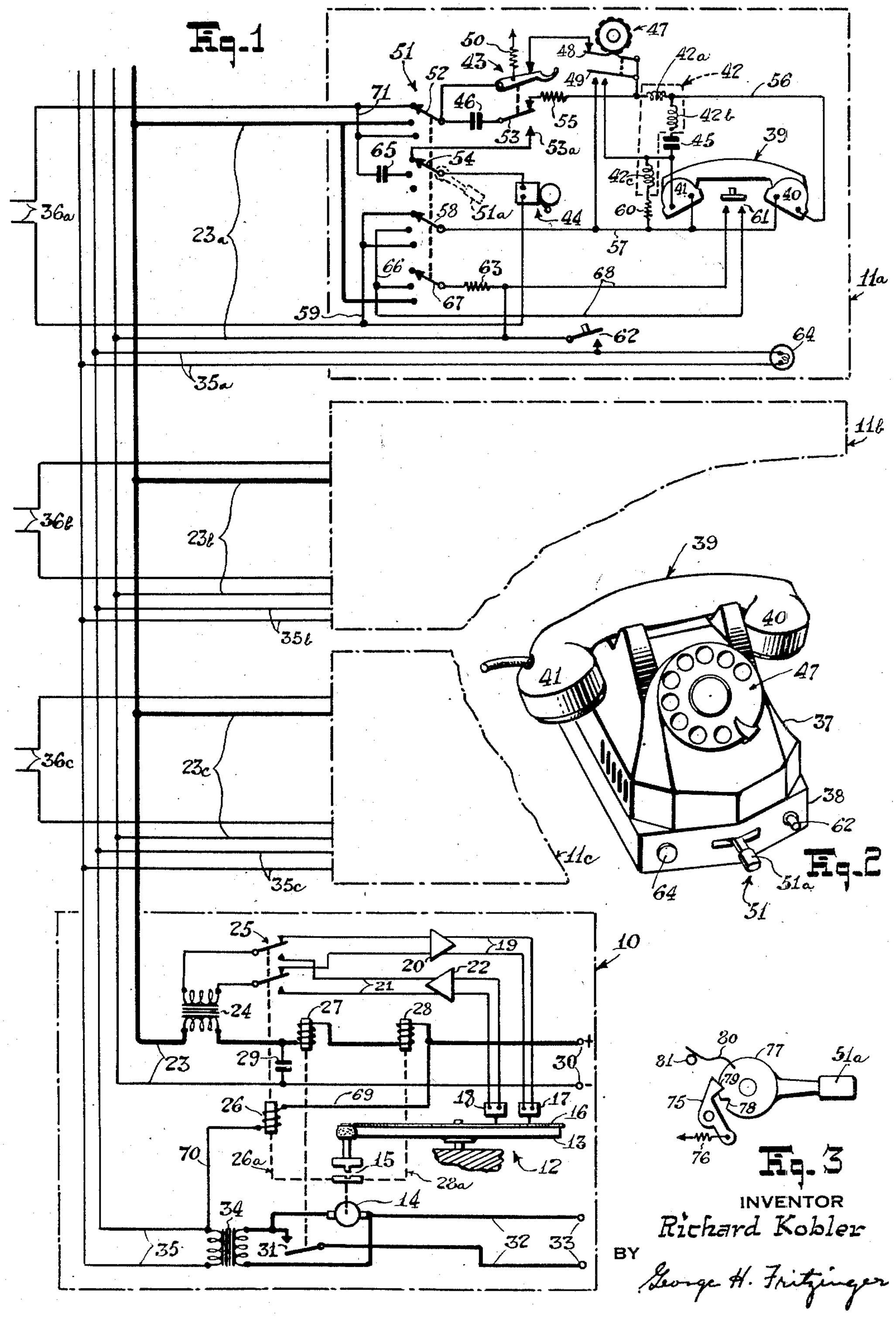
Figure 1 is a schematic diagram of circuits and apparatus illustrating a combined phonograph-telephone system according to a preferred embodiment of my invention.
Figure 2 is a perspective view of a combined subscriber's station telephone set and a phonograph adapter base according to my invention.
Figure 3 is a view of a detailed detenting and biasing means for the station selector switch.

The phonographic apparatus of the combined phonograph-telephone system shown in Figure 1 is of a dictation-recording type comprising an attendant's station 10 including a phonographic machine 12 and associated audio control circuits and devices, and a plurality of remote executives' stations of which three are indicated by box diagrams referred to as 11*a*, 11*b* and 11*c*. The circuits and apparatus of only one of these is shown since these stations may be identical. Only such portions of the phonographic machine are shown as need be considered for the purposes of the present invention.

The dictating machine 12 may comprise a record carrier in the form of a turntable 13 driven by a motor 14 through a clutch 15. Mounted on the turntable is a record disc 16, and engaging this disc is a recording unit 17 and a reproducing unit 18 trailing at a distance therefrom. It will be understood that the recorder and reproducer are moved progressively across the record disc as the turntable is rotated, but the apparatus for doing this need not be herein described. Audio speech-representing currents are fed to the recording unit through a circuit 19 serially including an amplifier 20, and such currents are fed from the reproducing unit 18 through a circuit 21 serially including an amplifier 22. Two amplifiers are here shown only to simplify the description, it being understood that one amplifier with suitable switches may suffice for both recording and reproducing.

The phonographic machine has further an audio circuit 23 serially including the primary of an audio transformer 24. The secondary of this transformer is connectable either to the recording circuit 19 or reproducing circuit 21 by means of a double-pole double-throw switch 25 constituting part of a relay 26. The audio circuit is preferably used also to control the machine, and for this purpose it includes two serially-connected relays 27 and 28. Audio currents are by-passed around these relays by a condenser 29. The audio circuit is energized from a low-voltage D.-C. power source (not shown) which is connected to terminals 30 marked + and — respectively. The relays 27 and 28 are adapted to operate at different levels of direct current established selectively at an executive's station by a user of the system, as will appear. The relay 27 has contacts 31 operated at a lower current level to close a power circuit 32 serially including the motor 14. This power circuit is energized from an A.-C. source (not shown) which is connected to terminals 33. The second relay 28 is adapted to operate at the higher level of current and controls the clutch 15 as represented diagrammatically by the tie line 28*a*. These relays may of course perform still other functions which need not however be herein described. For the present purposes, it will be understood that the motor 14 is started when the relay 27 is operated and that the clutch 15 is engaged to start rotation of the turntable 13 when the relay 28 is operated. An energization of the audio circuit 13 at the lower current level, with the resultant starting of the motor 14 or other conditioning of the machine for immediate start-stop operation, is herein considered as an activation of the phonographic system for use.

In the power circuit 32 and in shunt with the resistor 14 there is a voltage stepdown transformer 34, the secondary of which is connected to two outgoing leads constituting a signal circuit 35. This signal circuit is accordingly energized whenever the phonographic system is in an activated state.

A branch communication circuit leads from the audio circuit 23 to each of the remote executives' stations and is referred to by the number 23 with the suffix letter of the respective station; likewise, a branch signal circuit leads from the signal circuit 35 to each of the remote executives' stations and is referred to by the number 35 with the suffix letter of the respective station. Also, a telephone line leads to each of the remote executives' stations and is referred to by the number 36 with the suffix letter of the respective station.

Each remote executive's station includes a telephone subscriber's station equipment housed in the usual telephone box 37 shown in Figure 2, and includes also apparatus for phonograph use housed in a base 38 on which the telephone box is seated.

The subscriber's station equipment for telephone use, shown in Figure 1 comprises a handset 39 having as transducers a carbon-button transmitter 40 and a receiver 41, an induction coil 42 which in an anti-sidetone booster circuit includes three coupled windings **42*a*, 42*b* and 42*c*, a cradle or hook switch 43, a ringer 44, a talking condenser 45, a ringing condenser 46, a dial 47, an impulse spring-type switch 48 and an impulse spring-type shunting switch 49. The cradle switch 43 is biased into "on" position by means of a spring 50, but is held in "off" position by weight of the handset 39** when the latter is placed on its support as in the cradle shown in Figure 2.

A four-pole three-position station selector switch 51 is provided at each executive's station and is mounted in the base 38 and provided with an extending lever **51*a* for hand operation. When this switch is in "telephone" position—the position it occupies in Figure 1—the telephone station equipment is connected to the outgoing telephone line for normal telephone use. That is, the executive at that station using the system can dial outside parties, or be called thereby, for normal telephone conversation therewith. For instance, when the handset is on its support, the ringer 44 is connected across the telephone line 36*a* by way of a pole 52 of the selector switch 51, ringing condenser 46, pole 53 and contact 53*a* of the cradle switch 43, and pole 54 of the selector switch. As the handset is picked up, the cradle switch 43 is moved to "on" position to break the ringing circuit, by reason of pole 53 breaking with contact 53*a*, and to connect the telephone station apparatus to the telephone line in the usual way. The executive using the system can now dial outside parties to make telephone calls. For instance, the transmitter is now connected to the telephone line through the dial switch 48, paralleled by the ringing condenser 46 and resistor 55 (for suppression of transients during dialing), the winding 42*a* of induction coil 42, leads 56 and 57, pole 58 of the selector switch, and lead 59. The receiver 41 is paralleled with the transmitter through the winding 42*b* and through the condenser 45. Also, there is connected across the receiver the dial shunting switch 49 for eliminating noises in the receiver during dialing; still further, there is connected across the receiver the induction winding 42*c* and resistor 60** to suppress the side tones. Since this is a standard telephone circuit, the operation thereof need not be described.

The additional apparatus at each remote executive's station required for phonographic use of the system comprises only a recordation start-stop switch 61, a playback start-stop switch 62, a holding resistor 63, and a "busy" lamp 64. The lamp 64 is connected permanently across the respective branch signal circuit **35*a*. Connection of the other station equipment to the phonographic machine is made through the selector switch 51 when it is in its intermediate or "phonograph" position. In this positioning of the selector switch, the ringer 44 is connected independently of the cradle switch 43 across the telephone line 36*a* through the alternative ringing condenser 65 and pole 54 of the selector switch. If the handset is on its support, the cradle switch 43 is in "off" position to disconnect the station apparatus from the branch communication circuit 23*a*, leaving this branch circuit open. If the handsets are on their supports at all of the remote stations, the audio circuit 23 will be open, and the signal circuits will not be energized. However, upon removing the handset at station 11*a*, the cradle switch 43 is moved to "on" position to complete a direct-current connection across the branch communication circuit 23*a* through the dial switch 48, winding 42*a*, transmitter 40, pole 58, line 66, pole 67 of the selector switch and the resistor 63. This establishes the lower current level in the audio circuit 23 to cause the relay 27 to operate. As aforementioned, operation of this relay will start the motor 14 and cause the signal circuits to be energized to indicate that the phonographic system is in use, it being understood that the amplifiers 20 and 22 are normally in activated state whenever the system is on stand-by. The record start-stop switch 61 is connected by leads 68 and the pole 67 across the resistor 63 to shunt this resistor out of the circuit when the start-stop switch is closed. This causes the current in the audio circuit to be increased to the level at which the relay 28 operates to engage the clutch and start record rotation. At this higher current level, the transmitter 40 is also properly energized so that sounds spoken into the transmitter will produce corresponding undulations in the direct current in the audio circuit, which will be transmitted by the audio transformer 24 and amplifier 20 to the recorder 17**.

If the executive using the system closes the playback start-stop switch 62, a circuit through the relay 26 is completed from the positive terminal of the D.-C. source 30 through leads 69 and 70 to one side of the signal circuit 35, then through the corresponding side of the branch signal circuit **35*a*, switch 62 and back through the negative sides of the branch communication circuit 23*a* and audio circuit 23 to the negative terminal of the D. C. power source. As the relay 26 is energized, the switch 25 is operated to connect the reproducer to the audio circuit 23 through the amplifier 22 and transformer 24, and concurrently the clutch 15 is closed through a coupling diagrammatically represented by the tie line 26*a***. The machine is thereby put into operation for playback. Since the reproducer trails the recorder, the user can listen back to the last portion of his recording between the recorder and reproducer without backspacing these units with respect to the record disc.

Although the control or activating circuit and the communication circuit are herein combined to reduce the number of leads required between each remote operator's station and the attendant's station, it will be understood that for purposes of the invention the activating circuit and the communication circuit may be separate from one another. Also, it will be understood that when the selector switch is in reserve position the activating circuit may serve merely to maintain the phonographic machine ready for immediate use, or alternatively to reserve the machine positively for one's own use as in phonographic systems of the multistation type. A positive reservation of the machine in a multistation system may be accomplished for example by the apparatus described in the pending Logan application Serial No. 279,345, filed March 29, 1952, and having common ownership with the present application. However, for purposes of describing my invention, such positive reservation is not required and the control circuit is accordingly herein described as one merely for activating the machine and for causing busy lights to go on at all stations to indicate that the machine is being reserved.

Since the telephone and phonograph positions of the selector switch are normal positions for conditioning the system for normal telephone and normal phonograph use respectively, detent means are provided for holding the selector switch releasably in these positions. This detent means may comprise a pawl 75 urged by a spring 76 against a hub 77 of the hand lever **51*a* of the selector switch. In this hub are notches 78 and 79 for registration with the pawl when the switch is in telephone and phonograph positions respectively, as shown in Figure 3. As the switch is moved to its reserve position, a cantilever spring 80 which is fastened to the hub bears against a stop pin 81** to urge the switch back into phonograph position and to cause it to be so returned when the switch is released. Such spring return upon release of the switch is desired because the switch performs a temporary function when it is in its reserve position.

Since the selector switch remains normally in either telephone or phonograph position and the telephone-ringing circuit is operative in each of these positions, a person at an executive's station can be called by an outside party at any time irrespective of whether he is then using the system for phonographic purposes or not. If he is not so using the system at the time that he is called, he will pick up his handset and throw the selector switch to telephone position if it is not already there, to complete the calling circuit. If he is recording dictation while being called, he will merely throw the selector switch to its reserve position and hold it there until the telephone conversation is completed. In so doing, he will reserve the phonographic machine as against another would-be user during the telephone conversation, and will have the machine available when he removes his hand from the selector switch to allow it to return to phonograph position. The arrangement of the selector switch which enables an outside party to call any of the executives' stations at all times, except when the telephone line is busy, and which enables a user to hold the phonographic machine for his own use during the time that his recordation of dictation is interrupted by an outside call, are particularly important features of my invention which are adapted to facilitate greatly the use of a combined telephone-phonograph system.

The telephone-phonograph system herein particularly described is intended only as illustrative of my invention since many changes and modifications may be made therein without departure from the scope of my invention, which I endeavor to express according to the following claims.

I claim:

1. In a combined phonograph and telephone system: the combination of a phonographic machine; an executive's station including a transducer and a telephone signaling device; a communication circuit leading from the audio apparatus of said phonographic machine to said station; a telephone line leading to said station; multicircuit switching means at said station manually operable to different switching positions; means controlled by said switching means and effective when the latter is in one of its said positions to connect said transducer to said communication circuit for use of said phonographic machine by the station user and concurrently to connect said signaling device to said telephone line to enable said user to be called by an outside party while said phonographic machine is in use; and means controlled by said switching means and effective when the latter is in a second one of its said positions to connect said transducer to said telephone line for telephonic communication with an outside party.

2. In a combined phonograph and telephone system: the combination of a phonographic machine including audio circuits and a machine-activating device; an executive's station including a transducer, an on-off station switch and a telephone signaling device; circuit means leading from said station to said machine for making connection to said audio circuits and for controlling said machine-activating device; a telephone line leading to said station; multicircuit switching means at said station manually operable into different switching positions; and means connecting said switching means in circuit with said on-off station switch for causing, when said switching means is in a first position, said telephone line to be connected to said signaling device or transducer according to whether said on-off station switch is in "off" or "on" positions respectively, including means for causing, when said switching means is in a second position, said telephone line to be connected to said signaling device independently of said station switch and said transducer to be connected to said audio circuits and said activating device to be rendered operative only when said station switch is concurrently in "on" position.

3. The combination set forth in claim 2 wherein said switching means has a third position including means which, when said switching means is in said third position and said station switch is concurrently in "on" position, restores connection of said transducer to said telephone line and maintains said machine-activating device in operated position.

4. The combination set forth in claim 3 including detent means for holding releasably said switch device in its said first and second positions respectively, and spring means for restoring said switch device to said second position upon release of the switch device for said third position.

5. In a combined phonograph and telephone system: the combination of a phonographic machine having a combined communication and control circuit including means effective when said combined circuit is closed for flow of direct current therein to activate said machine for use; an executive's station including a transducer, an on-off station switch and a telephone signaling device; a telephone line leading to said executive's station; circuit means leading from said combined circuit to said executive's station; a unitary multicircuit selector switch device at said station movable into "telephone" and "phonograph" positions; means effective when said unitary switch device is in telephone position for connecting said transducer or signaling device to said telephone line according to whether said station switch is concurrently in "on" or "off" positions respectively; means effective when said switch device is in phonograph position for connecting said signaling device to said telephone line independently of said station switch; and means effective when said switch device is in phonograph position and said station switch is concurrently in "on" position for connecting said transducer to said combined circuit and for closing the latter for flow of direct current therein to cause activation of said phonographic machine.

6. The combination set forth in claim 5 wherein said unitary switch device is movable from said phonograph position into a "reserve" position, including means effective when said switch device is in said reserve position for maintaining closed said combined circuit independently of said station switch and for concurrently connecting said transducer to said telephone line only upon said station switch being in "on" position; and means to return said switch device to phonograph position upon release thereof from said reserve position.

7. In a combined phonograph and telephone system: the combination of a phonographic machine including audio circuits and means for activating said machine for use; an executive's station including a telephone signaling device and a transducer; a telephone line leading to said station; circuit means leading from said machine to said station; a unitary multicircuit switch device at said station having "phonograph" and other positions; means effective when said switch device is in phonograph position for connecting said signaling device to said telephone line, including means for concurrently connecting said transducer to said audio circuits and for rendering said activating means operative by way of said circuit means; and means effective when said unitary switch device is in said other position for maintaining said activating means in operated condition and for concurrently connecting said transducer to said telephone line.

8. The combination set forth in claim 7 including an on-off station control means effective upon said switch device being in phonograph position for placing said machine into activated and inactivated conditions as the station control means is moved to "on" and "off" positions respectively, and effective upon said switch device being in said other position for disconnecting and connecting said transducer from and to said telephone line as the station switch is moved to "off" and "on" positions respectively.

9. The combination set forth in claim 8 wherein said means for connecting said signaling device to said telephone line while said switch device is in phonograph position is independent of said on-off control means, and wherein said means for maintaining said activating means in operated condition while said switch device is in said other postion is also independent of said on-off control means.

10. The combination set forth in claim 8 including means effective while said switch device is in said other position for disconnecting said signaling device from said telephone line independently of said on-off control means.

11. The combination set forth in claim 7, including spring means for returning said switch device to phonograph position upon release thereof from said other position.

12. In a combined phonograph and telephone system: the combination of a phonographic machine having an audio circuit including means operable by direct current for activating said machine for start-stop operation; a plurality of executives' stations each including a telephone signaling device, a transducer and an on-off station switch; telephone lines leading to said stations respectively; branch communication circuits leading from said audio circuit to said stations respectively; a multicircuit selector switch at each of said stations having "phonograph" and other positions; means at each of said stations effective when the respective selector switch is in phonograph position for connecting the signaling device of that station to the respective telephone line; means at each of said stations effective upon the respective selector switch being in phonograph position and the respective station switch being concurrently in "on" position for connecting the transducer of that station to the respective branch communication circuit and for closing said branch communication circuit for flow of direct current therein to operate said machine-activating means; and means at each of said stations effective as the selector switch thereof is moved to said other position for switching the transducer of that station from the respective branch communication circuit to the respective telephone line to enable telephone communication with an outside party and for concurrently maintaining the respective branch communication circuit closed to keep the phonographic machine activated during the telephone conversation.

13. In a combined phonograph and telephone system: the combination of a phonographic machine having an audio circuit; a plurality of executive stations each having a telephone signaling device, a transducer and a phonograph busy-signaling device; a telephone line leading to each of said stations; circuit means leading from said machine to said stations respectively; a multicircuit switch device in each of said stations having "phonograph" and other positions; means effective when the switch device of one of said stations is in phonograph position for connecting the telephone signaling device of that station to the respective telephone line, including means for concurrently connecting the respective transducer to said phonograph audio circuit and for activating the busy-signaling devices at all of said stations; and means rendered effective by said switch device of said one station as the same is moved to another of its said positions for switching the transducer of that station from said phonograph audio circuit to the respective telephone line and for maintaining all of said busy-signaling devices activated.

No references cited.